United States Patent
Cho et al.

(10) Patent No.: US 8,170,471 B2
(45) Date of Patent: May 1, 2012

(54) COOPERATIVE COMMUNICATION METHOD FOR VEHICULAR COMMUNICATION

(75) Inventors: Woong Cho, Daejeon (KR); Hyun Seo Oh, Daejeon (KR); Dong Yong Kwak, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 228 days.

(21) Appl. No.: 12/631,351

(22) Filed: Dec. 4, 2009

(65) Prior Publication Data

US 2010/0184369 A1 Jul. 22, 2010

(30) Foreign Application Priority Data

Dec. 4, 2008 (KR) .................. 10-2008-0122733
Apr. 28, 2009 (KR) .................. 10-2009-0037198

(51) Int. Cl.
*H04B 7/15* (2006.01)
(52) U.S. Cl. .... 455/11.1; 455/16; 455/456.6; 455/67.11
(58) Field of Classification Search ............... 455/11.1, 455/9, 67.11, 13.1, 16, 457, 458, 456.1, 456.6, 455/452.1, 7, 569.2, 17, 23; 342/357.01, 342/357.02
See application file for complete search history.

(56) References Cited

U.S. PATENT DOCUMENTS

| | | | |
|---|---|---|---|
| 7,606,182 B2 | 10/2009 | Park et al. | |
| 2001/0036833 A1* | 11/2001 | Koshima et al. | 455/457 |
| 2003/0162528 A1* | 8/2003 | Juzswik | 455/411 |
| 2004/0162085 A1* | 8/2004 | Han | 455/456.1 |
| 2007/0086512 A1 | 4/2007 | Can et al. | |
| 2008/0165720 A1 | 7/2008 | Hu et al. | |
| 2009/0047901 A1 | 2/2009 | Yu et al. | |
| 2009/0116423 A1 | 5/2009 | Ni et al. | |
| 2009/0130975 A1 | 5/2009 | Horiuchi et al. | |
| 2009/0176492 A1 | 7/2009 | Kwon et al. | |

FOREIGN PATENT DOCUMENTS

| | | |
|---|---|---|
| KR | 1020070004370 | 1/2007 |
| KR | 1020070034408 | 3/2007 |
| KR | 1020080069753 | 7/2008 |
| KR | 1020090017199 | 2/2009 |
| KR | 1020090075102 | 7/2009 |

OTHER PUBLICATIONS

Cho, Woong et al., "Effect of Relay Locations in Cooperative Networks," *Wireless Vitae* (2009).

* cited by examiner

*Primary Examiner* — John J Lee
(74) *Attorney, Agent, or Firm* — Nelson Mullins Riley & Scarborough LLP; EuiHoon Lee, Esq.

(57) ABSTRACT

A cooperative communication method for vehicular communication is provided. The method in which when one vehicle transmits a signal to another vehicle, a signal of a transmission vehicle passes through a roadside device or a plurality of vehicles and thereafter signals having a plurality of paths are transmitted to a reception vehicle, and the reception vehicle combines and demodulates the signals received through the plurality of paths.

10 Claims, 6 Drawing Sheets

COOPERATIVE COMMUNICATION METHOD FOR VEHICULAR COMMUNICATION

CROSS-REFERENCE TO RELATED APPLICATION

This application claims priority to and the benefit of Korean Patent Application Nos. 10-2008-0122733 and 10-2009-0037198 filed in the Korean Intellectual Property Office on Dec. 4, 2008 and Apr. 28, 2009, the entire contents of which are incorporated herein by reference.

BACKGROUND OF THE INVENTION (a) Field of the Invention

The present invention relates to a cooperative communication method for vehicular communication, and more particularly, to a cooperative communication method using a plurality of vehicles or roadside devices in vehicular communication.

(b) Description of the Related Art

In the existing mobile communication system, transmission of a signal using a repeater has been widely adopted.

In particular, in the standard for a next-generation wireless communication system, communication using the repeater is adopted as the standard.

A cooperative communication technique in which when signals of repeaters are received at a receiver, the signals are combined and demodulated, has been proposed.

The cooperative communication technique can expect improvement of communication performance through a diversity gain.

A vehicle communication system forms a communication network by communication devices mounted on each vehicle without controlling a base station, unlike the existing mobile communication method.

A method for vehicle communication using one vehicle as the repeater has been considered, but a cooperative communication method using a plurality of vehicles or roadside devices (relays) has not yet been discussed. In other words, the existing cooperative communication method has not been adopted for a vehicle communication system.

SUMMARY OF THE INVENTION

The present invention has been made in an effort to provide a cooperative communication method using a plurality of vehicles or roadside devices in vehicular communication.

An exemplary embodiment of the present invention provides a cooperative communication method including: (a) allowing a transmission vehicle to initialize parameters of the transmission vehicle and scan signals for adjacent repeaters positioned adjacent to the transmission vehicle, the parameters including a threshold distance and a maximum number of repeaters; (b) allowing the transmission vehicle to select repeaters that the selected repeaters number is equal to or less than the maximum number of repeaters, select information on the selected repeaters, and verify distances to the selected repeaters when receiving a signal from an adjacent repeater; (c) allowing the transmission vehicle to set a decode-and-forward mode or an amplify-and-forward mode depending on the positions of the selected repeaters and broadcasting a signal to the adjacent repeaters; (d) allowing the adjacent repeaters to transmit the signal form the transmission vehicle to a reception vehicle in the decode-and-forward mode or the amplify-and-forward mode; and (e) allowing the reception vehicle to combine and demodulate received signals when the received signal is stored in a buffer and thereafter signals are received from all repeaters.

Another embodiment of the present invention provides a cooperative communication method including: (a) allowing a transmission vehicle to initialize parameters of the transmission vehicle and scan signals for adjacent repeaters positioned adjacent to the transmission vehicle, the parameters including a threshold distance and a maximum number of repeaters; (b) allowing the transmission vehicle to select repeaters that the selected repeaters number is equal to or less than the maximum number of repeaters, select information on the selected repeaters, and verify distances to the selected repeaters when receiving a signal from an adjacent repeater; (c) allowing the transmission vehicle to set a decode-and-forward mode or an amplify-and-forward mode depending on the positions of the selected repeaters, generate a time-space code matrix of a predetermined time-space code matrix, and broadcast all row signals to the adjacent repeaters; (d) allowing the adjacent repeaters to transmit the row signals of the corresponding time-space code matrix to a reception vehicle in the decode-and-forward mode or the amplify-and-forward mode; and (e) allowing the reception vehicle to combine and demodulate received signals when the received signal is stored in a buffer and thereafter signals are received from all repeaters.

Yet another embodiment of the present invention provides a cooperative communication method including: (a) allowing a transmission vehicle to initialize parameters of the transmission vehicle and scan signals for adjacent repeaters positioned adjacent to the transmission vehicle, the parameters including a threshold distance and a maximum number of repeaters; (b) allowing the transmission vehicle to select repeaters that the selected repeaters number is equal to or less than the maximum number of repeaters, select information on the selected repeaters, and verify distances to the selected repeaters when receiving a signal from an adjacent repeater; (c) allowing the transmission vehicle to classify a signal as a decode-and-forward group when a distance to a selected repeater is smaller than the threshold distance and determine the size of a time-space code matrix to broadcast a signal to the adjacent repeaters; (d) allowing the adjacent repeaters to demodulate the signal received from the transmission vehicle generate a time-space code matrix of the size of the time-space code matrix, and transmit a signal corresponding to each repeater to a reception vehicle; and (e) allowing the reception vehicle to combine and demodulate received signals when the received signal is stored in a buffer and thereafter signals are received from all repeaters.

By the above-mentioned configuration, according to an embodiment of the present invention, it is possible to expect an effect of improved communication performance in inter-vehicle communication.

According to an embodiment of the present invention, it is possible to provide a cooperative communication method using a plurality of vehicles or roadside devices in vehicular communication.

According to an embodiment of the present invention, it is possible to expect improvement in communication performance caused by a spatial diversity gain by defining a signal transmission method in a transmission vehicle depending on the position of a repeater.

DETAILED DESCRIPTION OF THE EMBODIMENTS

Figure 1:
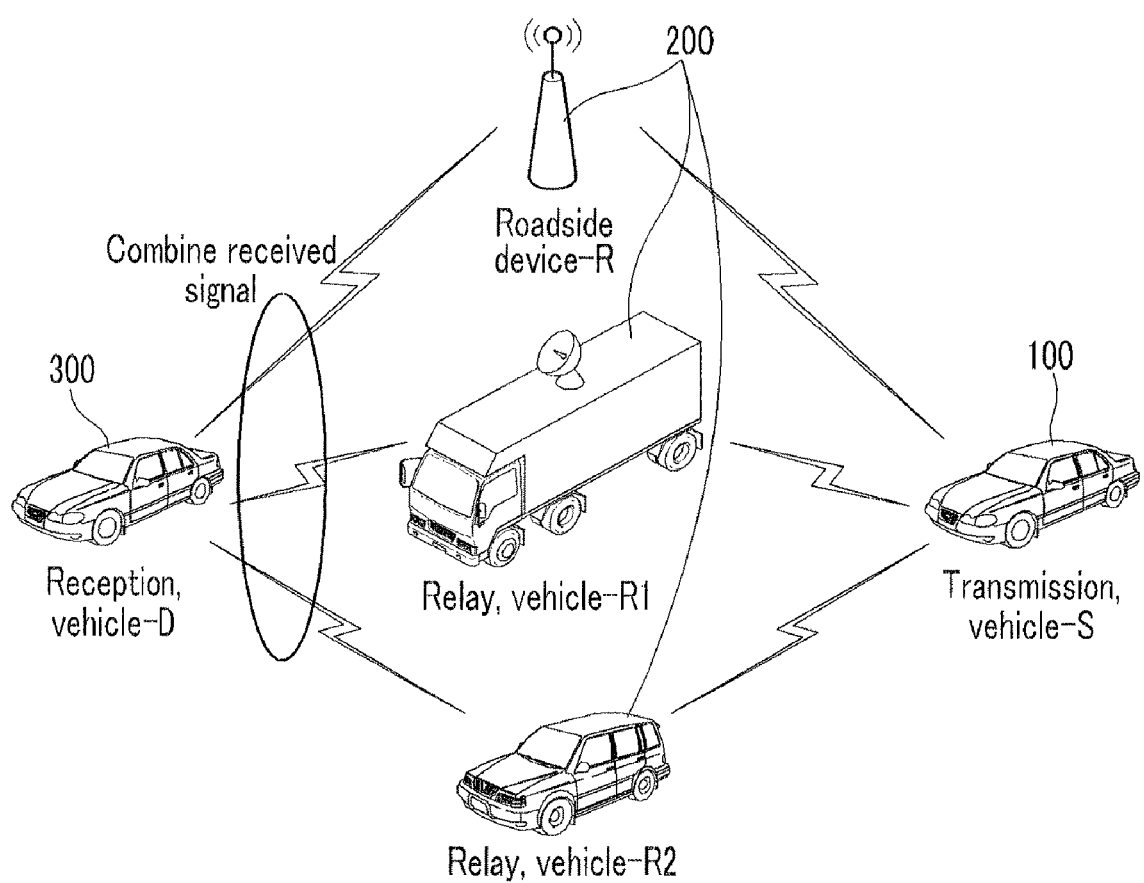
FIG. 1 is a diagram illustrating a conceptual diagram of a cooperative communication method in a vehicle communication system according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising", will be understood to imply the inclusion of stated elements but not the exclusion of any other elements.

An embodiment of the present invention proposes a method to improve the performance by adopting a cooperative communication method in vehicular communication.

FIG. 1 is a diagram illustrating a conceptual diagram of a cooperative communication method in a vehicle communication system according to an embodiment of the present invention.

In the cooperative communication method in the vehicle communication system according to the embodiment of the present invention, when a vehicle-S (source) 100 transmits a signal to a vehicle-D (destination) 300, the two vehicles do not directly transmit the signal to each other, but the signal transmitted from the vehicle-S 100 is transmitted to the vehicle-D 300 through a roadside device-R (relay) 200 or a plurality of vehicles (vehicle-R1 and vehicle-R2) 200. Subsequently, the vehicle-D 300 combines signals received from a plurality of paths and demodulates the combined signals.

Herein, the roadside device-R 200, the vehicle-R1 200, and the vehicle-R2 200 serve as repeaters that transmit the signals received from the vehicle-S 100.

The repeater may be constituted by one vehicle 200, one roadside device 200, a plurality of vehicles 200 and roadside devices 200, a plurality of vehicles 200, etc.

Figure 2:
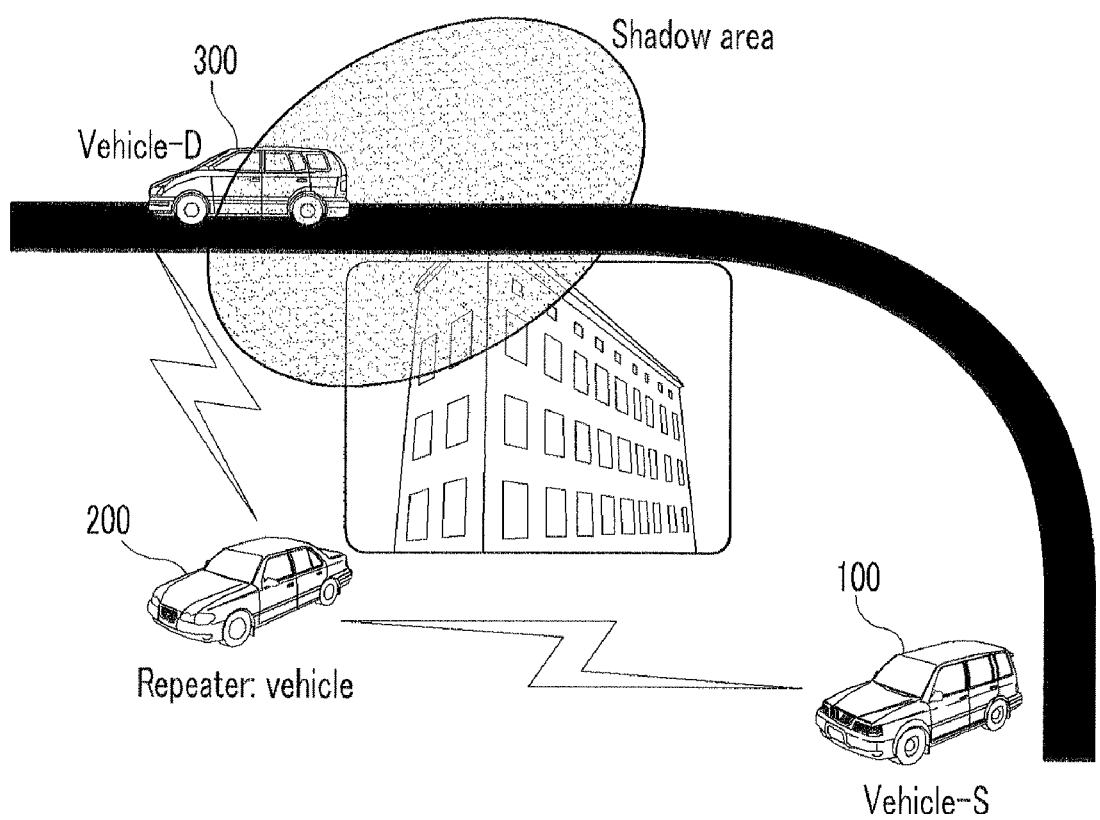
FIG. 2 is a diagram illustrating a case of using only one vehicle as a repeater in a vehicle communication system according to an embodiment of the preset invention.
Figure 3:
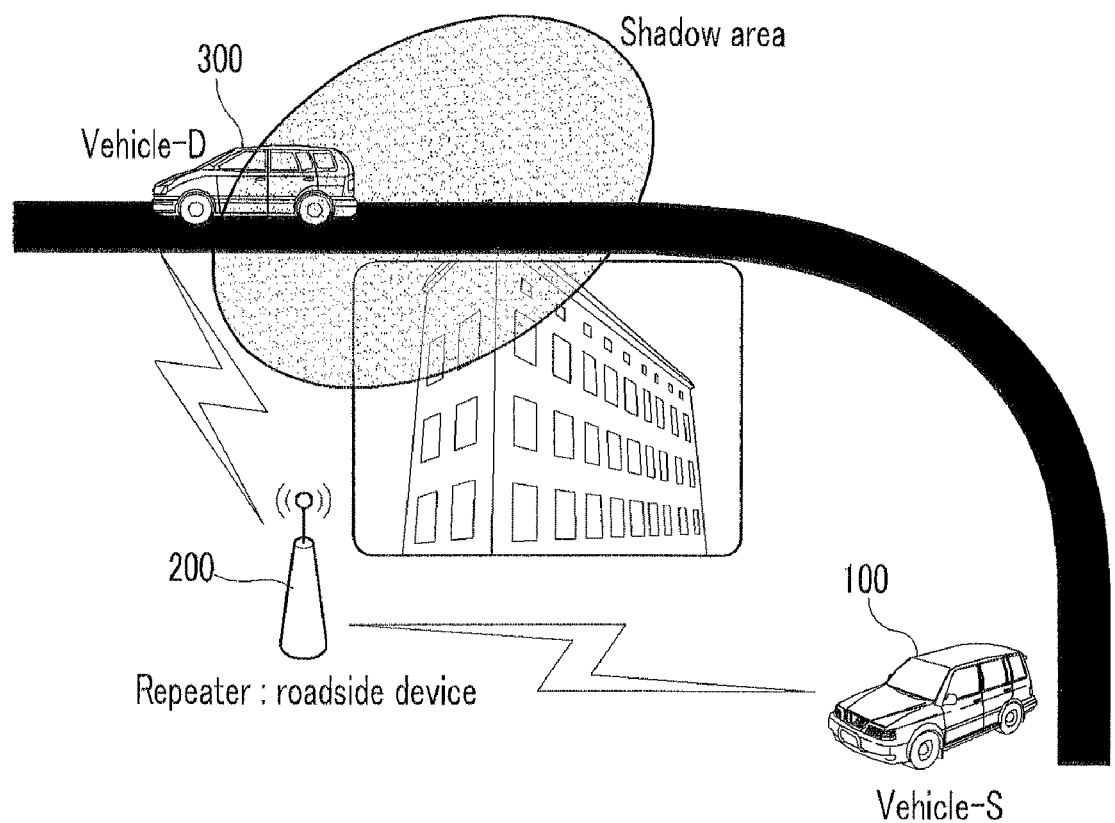
FIG. 3 is a diagram illustrating a case of using only one roadside device as a repeater in a vehicle communication system according to an embodiment of the preset invention.

FIG. 2 is a diagram illustrating a case of using only one vehicle as a repeater in a vehicle communication system according to an embodiment of the preset invention, and FIG. 3 is a diagram illustrating a case of using only one roadside device as a repeater in a vehicle communication system according to an embodiment of the preset invention.

As shown in FIGS. 2 and 3, it is possible to transmit the signal to the vehicle communication system implementing cooperative communication by using one repeater 200 without passing through a shadow area.

Herein, the repeaters 200 can operate in a decode-and-forward (DF) mode or an amplify-and-forward (AF) mode.

The decode-and-forward (DF) mode is a mode to transmit the signal after demodulating and remodulating the signal transmitted from a transmission vehicle, that is, a vehicle-S 100, and the amplify-and-forward (AF) mode is the mode to transmit the signal by just amplifying the received signal.

The vehicle-S 100 can determine a mode to transmit the signal in a relaying vehicle.

In the case where a plurality of repeaters or one repeater is present, the signal can be transmitted by selecting any one mode of the decode-and-forward mode and the amplify-and-forward mode. The vehicle-S 100 can select the relaying mode depending on the position of the repeater.

The transmission method can be largely classified into three types.

The first cooperative communication method 1 (hereinafter referred to as "CCM1") is a method in which, when the vehicle-S 100 transmits general signals (phase shift keying (PSK), quadrature amplitude modulation (QAM), and differential PSK (DPSK)) that are widely used in communication to the repeater in a broadcasting form, the repeaters 200 repeatedly transmit the signal from the vehicle-S 100 in the decode-and-forward mode or the amplify-and-forward mode.

The second cooperative communication method 2 (hereinafter referred to as "CCM2") is a method in which, when the vehicle-S 100 transmits the signal, a space-time code matrix is generated by using space-time coding (STC), all signals of the space-time code matrix are broadcasted to the repeaters 200, and each of the repeaters 200 transmits a matrix signal of the corresponding space-time matrix to a reception vehicle, that is, a vehicle-D 300 in the decode-and-forward mode or the amplify-and-forward mode.

The third cooperative communication method 3 (hereinafter referred to as "CCM3") is a method in which, when the vehicle-S 100 broadcasts a general signal to the repeaters 200, each of the repeaters 200 demodulates the received signal and generates a space-time code matrix by using the demodulated signal and thereafter transmits the matrix signal of the corresponding space-time code to the vehicle-D 300.

The vehicle-D 300 demodulates the signal by combining the signals received by the three methods.

Figure 4:
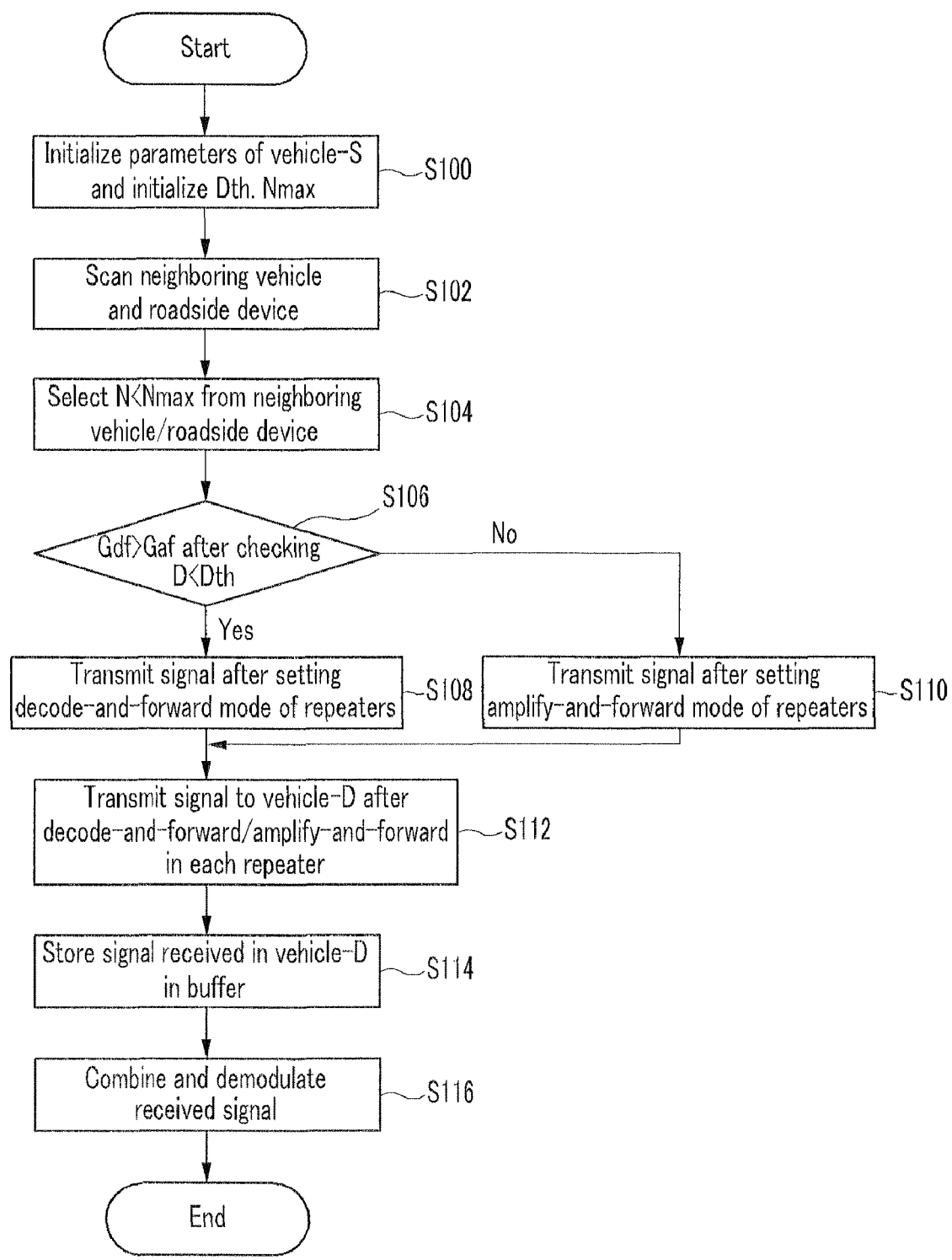
FIG. 4 is a diagram for describing a cooperative communication method for vehicular communication corresponding to CCM1 according to an embodiment of the present invention.

FIG. 4 is a diagram for describing a cooperative communication method for vehicular communication corresponding to CCM1 according to an embodiment of the present invention.

First, the vehicle-S 100 initializes parameters of the vehicle-S 100 and scans signals for neighboring vehicles of the vehicle-S 100 (S100 and S102). Herein, the parameters of the vehicle-S 100 represent a threshold distance Dth and the maximum number Nmax of repeaters.

The threshold distance is determined by receiving positional information from the neighboring vehicle 200 or by the intensities of the signals received from the neighboring vehicles 200 when there is no positional information. The number of repeaters is previously defined in the system.

When the vehicle-S 100 receives the signal from the neighboring vehicle 200 or the roadside device 200, repeater information in which the number N of repeaters is equal to or less than the maximum number Nmax of repeaters is selected, and thereafter the distance from the neighboring vehicle 200 or the roadside device 200 is verified (S104).

The vehicle-S 100 classifies signals into a decode-and-forward group Gdf when the distance D of the repeater 200 is smaller than the threshold distance Dth and an amplify-andforward group Gaf when the distance D of the repeater 200 is larger than the threshold distance Dth (S106).

Subsequently, the vehicle-S 100 determines whether signals of the decode-and-forward groups are more than the signals of the amplify-and-forward groups (S106).

The vehicle-S 100 sets the signal in the decode-and-forward mode when there are more signals of the decode-and-forward groups than signals of the amplify-and-forward groups and sets the signal in the amplify-and-forward mode when there are more signals of the amplify-and-forward groups than signals of the decode-and-forward groups, and thereafter broadcasts the signal to the corresponding repeaters 200 (S108 and S110).

Each of the repeaters 200 transmits the received signals to the vehicle-D 300 in the decode-and-forward mode or the amplify-and-forward mode (S112).

After the received signal is stored in a buffer and the signal is received from all the repeaters 200, the vehicle-D 300 combines and demodulates the received signals (S114 and S116).

Figure 5:
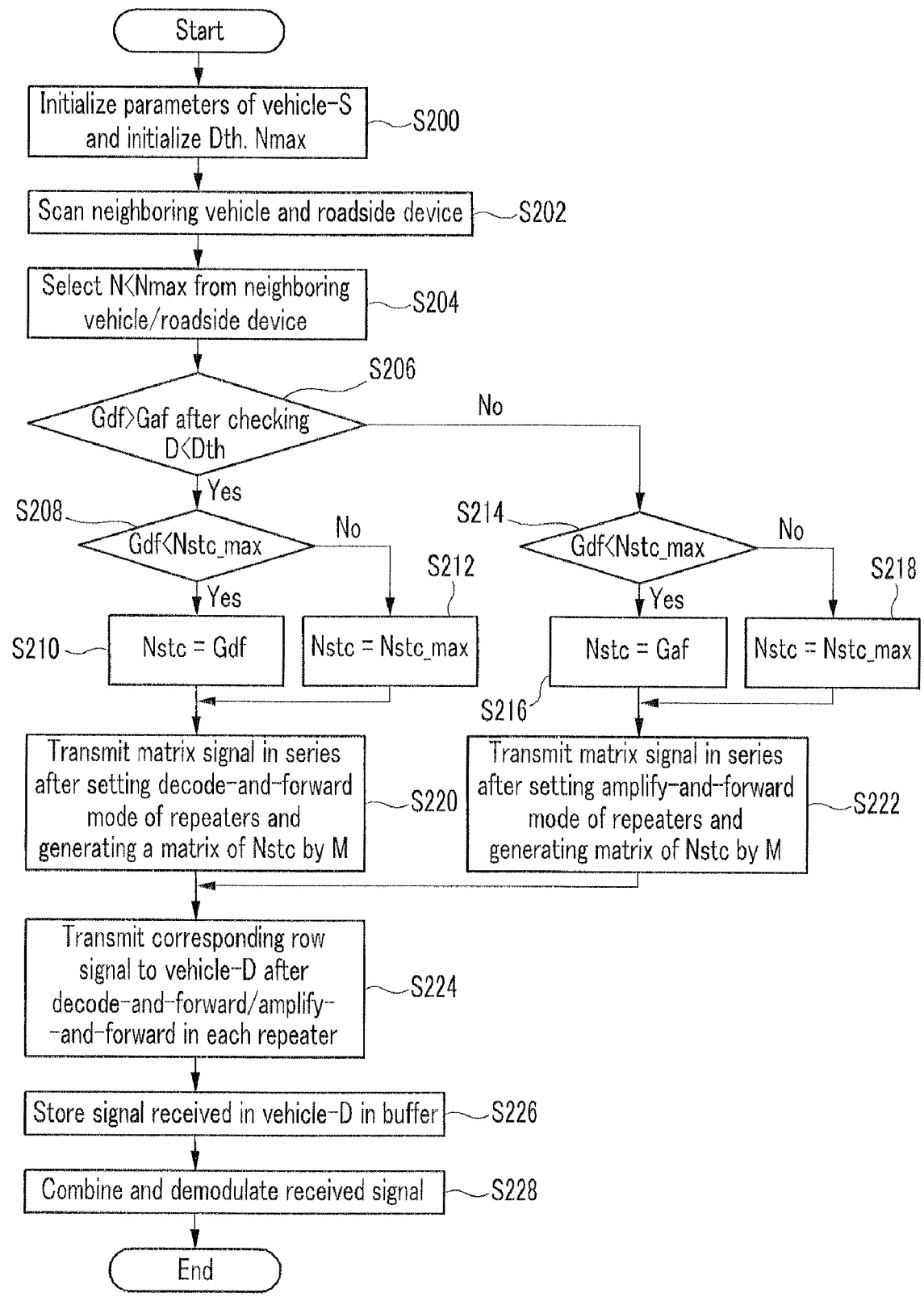
FIG. 5 is a diagram for describing a cooperative communication method for vehicular communication corresponding to CCM2 according to an embodiment of the present invention.

FIG. 5 is a diagram for describing a cooperative communication method for vehicular communication corresponding to CCM2 according to an embodiment of the present invention.

The vehicle-S 100 initializes parameters of the vehicle-S 100 and scans signals for neighboring vehicles of the vehicle-S 100 (S200 and S202).

When the vehicle-S 100 receives the signal from the neighboring vehicle 200 or the roadside device 200, repeater information in which the number of repeaters is equal to or less than the maximum number of repeaters is selected, and thereafter the distance from the neighboring vehicle 200 or the roadside device 200 is verified (S204).

The vehicle-S 100 classifies signals into a decode-and-forward group Gdf when the distance D of the repeater 200 is smaller than the threshold distance Dth and an amplify-and-forward group Gaf when the distance D of the repeater 200 is larger than the threshold distance Dth (S206).

Subsequently, the vehicle-S 100 determines whether there are more signals of the decode-and-forward groups than signals of the amplify-and-forward groups (S206).

Subsequently, the vehicle-S 100 sets the signal in the decode-and-forward mode when there are more signals of the decode-and-forward groups than amplify-and-forward groups and sets the signal in the amplify-and-forward mode when there are more signals of the amplify-and-forward groups than signals of the decode-and-forward groups (S206).

The vehicle-S 100 determines the transmission method and determines the size Nstc of the space-time code matrix.

When the decode-and-forward mode is set, the vehicle-S 100 compares the maximum matrix size Nstc_max of a predetermined time-space code with the decode-and-forward Gdf. At this time, when the decode-and-forward group Gdf is smaller than the maximum matrix size, the vehicle-S 100 sets the size Gdf of the matrix of the decode-and-forward group as the size of the time-space code matrix, and when the decode-and-forward group Gdf is larger than the maximum matrix size, the vehicle-S 100 sets the maximum matrix size as the size of the time-space code matrix (S208, S210, and S212). Herein, the time-space code matrix represents a predetermined matrix.

Before time-space coding, data has a digital value of 0.1, and depending on the number of repeaters, data configured by 0.11 corresponds to the time-space code matrix.

When the amplify-and-forward mode is set, the vehicle-S 100 compares the maximum matrix size Nstc_max of a predetermined time-space code with the amplify-and-forward Gaf. At this time, when the amplify-and-forward group Gal is smaller than the maximum matrix size, the vehicle-S 100 sets the size Gaf of the matrix based on the amplify-and-forward group as the size of the time-space code matrix, and when the amplify-and-forward group Gaf is larger than the maximum matrix size, the vehicle-S 100 sets the maximum matrix size as the size of the time-space code matrix (S214, S216, and S218).

As such, even though the number of signals of groups selected when the size of the actual time-space code matrix of Nstc is determined is many, the size of the time-space code matrix is determined by the defined number of time-space codes.

The vehicle-S 100 determines the transmission mode (decode-and-forward or amplify-and-forward) and generates the time-space code matrix of the size Nstc by M of the time-space code matrix, and thereafter broadcasts all row signals of the matrix to the repeater 200 in series (S220 and S222). Herein, in Nstc by M, M represents a predetermined integer, and it varies depending on a predetermined type of the time-space code matrix.

At this time, the vehicle-S 100 also transmits information on which row in which each of the repeaters 200 transmits the signal is in. That is, the vehicle-S 100 should report a predetermined row signal to be sent among the signals of the time-space matrix type.

Each of the repeaters 200 transmits the row signal of the corresponding time-space matrix to the vehicle-D 300 in the decode-and-forward mode or the amplify-and-forward mode (S224).

After the received signal is stored in the buffer and the signal is received from all the repeaters 200, the vehicle-D 300 combines and demodulates the received signals (S226 and S228).

A difference between CCM1 and CCM2 is that as the signal is transmitted from the vehicle-S 100, the general communication signal is transmitted in CCM1 and the time-space code matrix is transmitted in CCM2.

Figure 6:
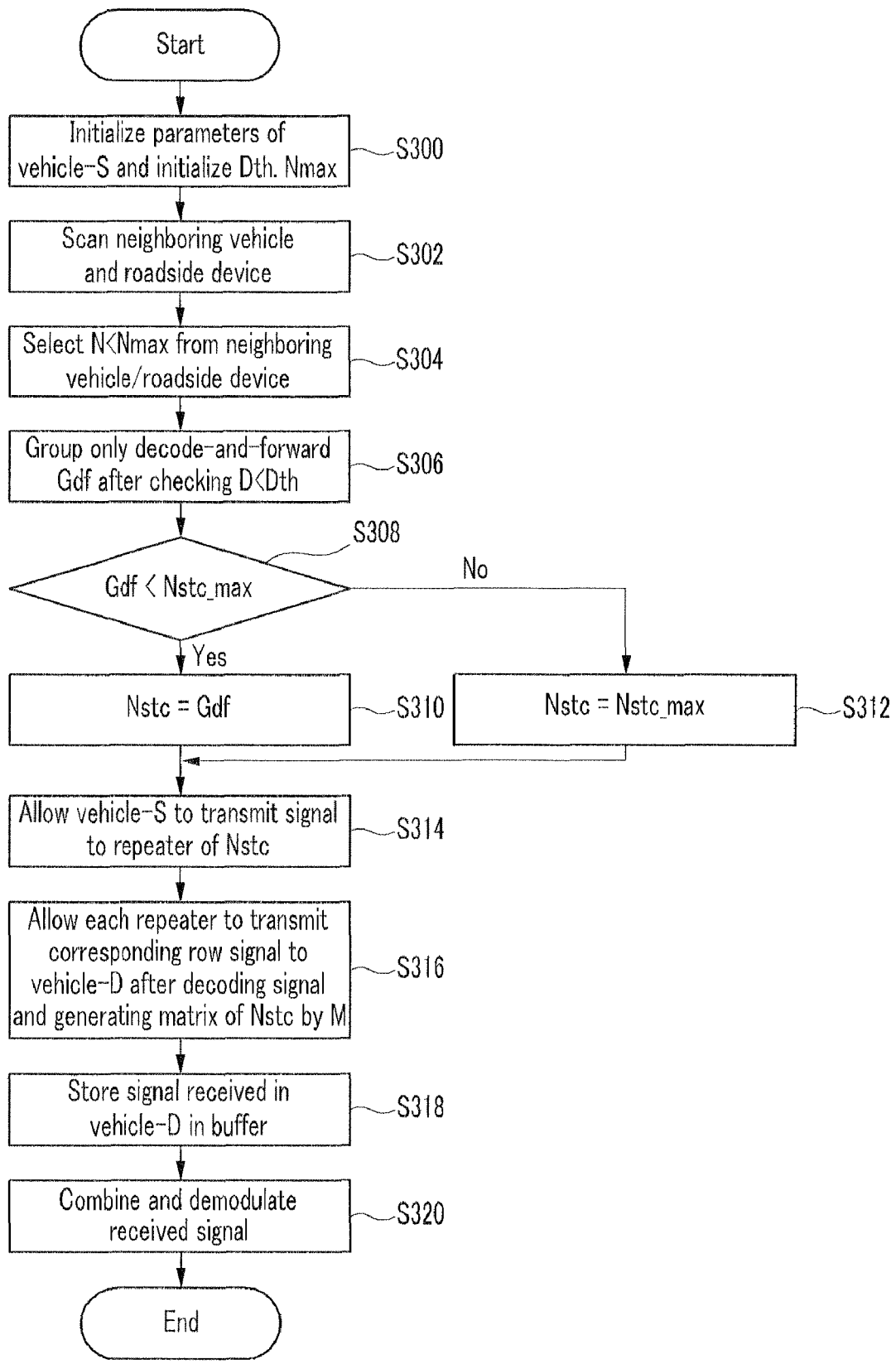
FIG. 6 is a diagram for describing a cooperative communication method for vehicular communication corresponding to CCM3 according to an embodiment of the present invention.

FIG. 6 is a diagram for describing a cooperative communication method for vehicular communication corresponding to CCM3 according to an embodiment of the present invention.

The vehicle-S 100 initializes parameters of the vehicle-S 100 and scans signals for neighboring vehicles 200 of the vehicle-S 100 (S300 and S302).

When the vehicle-S 100 receives the signal from the neighboring vehicle 200 or the roadside device 200, repeater information in which the number of repeaters is equal to or less than the maximum number of repeaters is selected, and thereafter the distance from the neighboring vehicle 200 or the roadside device 200 is verified (S304).

The vehicle-S 100 groups and separates the signals of the decode-and-forward group Gdf when the distance D of the repeater 200 is smaller than the threshold distance Dth (S306).

In CM3, since the general communication signal in the vehicle-S 100 and the time-space code using the general communication signal in the repeater 200 are determined, the amplify-and-forward is impossible. That is, the amplify-and-forward is a method to amplify the signal itself (general communication signal or time-space code) transmitted from the vehicle-S 100 in the repeater 200.

The vehicle-S 100 compares the maximum matrix size Nstc_max of a predetermined time-space code with the decode-and-forward Gdf, and at this time, when the decode-and-forward group Gdf is smaller than the maximum matrix size, the vehicle-S 100 sets the size Gdf of the matrix of the decode-and-forward group as the size of the time-space code matrix, and when the decode-and-forward group Gdf is larger than the maximum matrix size, the vehicle-S 100 sets the maximum matrix size as the size of the time-space code matrix (S308, S310, and S312).

The vehicle-S 100 broadcasts the signal to the repeater 200, and at this time, the vehicle-S 100 also transmits information on a row in which each of the repeaters 200 transmits the signal (S314).

The repeaters demodulate the signal received in the vehicle-S 100, and thereafter generate the time-space code matrix of the size of Nstc by M and transmit the row signal corresponding to each repeater 200 to the vehicle-D 300 (S316).

A difference between CCM3 and CCM2 is that the time-space code matrix is generated in the repeater 200.

After the received signal is stored in the buffer and the signal is received from all the repeaters 200, the vehicle-D 300 combines and demodulates the received signals (S318 and S320).

The present invention considers that the signal transmission method of the vehicle-S 100 is defined depending on the position of the repeater (vehicle or roadside device) 200.

The present invention considers three transmission methods such as communication using the general modulation method, communication using a time-space code, and a method mixing the methods.

It is possible to expect improvement in communication performance caused by a spatial diversity gain through a cooperative communication method according to an embodiment of the present invention.

The above-mentioned exemplary embodiments of the present invention are not embodied only by an apparatus and/or method. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A cooperative communication method in a vehicle communication system, comprising:
   (a) allowing a transmission vehicle to initialize parameters of the transmission vehicle and scan signals for adjacent repeaters positioned adjacent to the transmission vehicle, the parameters including a threshold distance and a maximum number of repeaters;
   (b) allowing the transmission vehicle to select repeaters that the selected repeaters number is equal to or less than the maximum number of repeaters, select information on the selected repeaters, and verify distances to the selected repeaters when receiving a signal from an adjacent repeater;
   (c) allowing the transmission vehicle to set a decode-and-forward mode or an amplify-and-forward mode depending on positions of the selected repeaters and broadcasting a signal to the adjacent repeaters;
   (d) allowing the adjacent repeaters to transmit the signal form the transmission vehicle to a reception vehicle in the decode-and-forward mode or the amplify-and-forward mode; and
   (e) allowing the reception vehicle to combine and demodulate a received signal when the received signal is stored in a buffer and thereafter signals are received from all repeaters.

2. The cooperative communication method of claim 1, wherein
   (c) includes
   classifying a signal as a decode-and-forward group when a distance to a selected repeater is smaller than the threshold distance and classifying a signal as an amplify-and-forward group when a distance to a selected repeater is larger than the threshold distance,
   setting a signal in the decode-and-forward mode when there are more signals of the decode-and-forward groups than signals of the amplify-and-forward groups and setting a signal in the amplify-and-forward mode when there are more signals of the amplify-and-forward groups than signals of the decode-and-forward groups, and
   broadcasting the signal in the amplify-and-forward mode or the decode-and-forward mode to the adjacent repeaters.

3. A cooperative communication method in a vehicle communication system, comprising:
   (a) allowing a transmission vehicle to initialize parameters of the transmission vehicle and scan signals for adjacent repeaters positioned adjacent to the transmission vehicle, the parameters including a threshold distance and a maximum number of repeaters;
   (b) allowing the transmission vehicle to select repeaters that the selected repeaters number is equal to or less than the maximum number of repeaters, select information on the selected repeaters, and verify distances to the selected repeaters when receiving a signal from an adjacent repeater;
   (c) allowing the transmission vehicle to set a decode-and-forward mode or an amplify-and-forward mode depending on positions of the selected repeaters, generate a time-space code matrix of a predetermined time-space code matrix, and broadcast all row signals to the adjacent repeaters;
   (d) allowing the adjacent repeaters to transmit the row signals of the corresponding time-space code matrix to a reception vehicle in the decode-and-forward mode or the amplify-and-forward mode; and
   (e) allowing the reception vehicle to combine and demodulate a received signal when the received signal is stored in a buffer and thereafter signals are received from all repeaters.

4. The cooperative communication method of claim 3, wherein,
   (c) includes,
   classifying a signal as a decode-and-forward group when a distance to a selected repeater is smaller than the threshold distance and classifying a signal as an amplify-and-forward group when a distance to a selected repeater is larger than the threshold distance, setting a signal in the decode-and-forward mode when there are more signals of the decode-and-forward groups than signals of the amplify-and-forward groups and setting a signal in the amplify-and-forward mode when there are more signals of the amplify-and-forward groups than signals of the decode-and-forward groups, and broadcasting the signal in the amplify-and-forward mode or the decode-and-forward mode to the adjacent repeaters.

5. The cooperative communication method of claim 3, wherein, in (c), when the decode-and-forward mode is set, the transmission vehicle compares the maximum matrix size of a predetermined time-space code with size of a matrix of the decode-and-forward group, and when the size of the matrix of the decode-and-forward group is smaller than the maximum matrix size, the transmission vehicle sets the size of the matrix of the decode-and-forward group as the size of the time-space code matrix, and when the size of the matrix of the decode-and-forward group is larger than the maximum matrix size, the transmission vehicle sets the maximum matrix size as the size of the time-space code matrix.

6. The cooperative communication method of claim 3, wherein.

in (c), when the amplify-and-forward mode is set, the transmission vehicle compares the maximum matrix size of a predetermined time-space code with size of a matrix of the amplify-and-forward group, and when the size of the matrix of the amplify-and-forward group is smaller than the maximum matrix size, the transmission vehicle sets the size of the matrix of the amplify-and-forward group as the size of the time-space code matrix, and when the size of the matrix of the amplify-and-forward group is larger than the maximum matrix size, the transmission vehicle sets the maximum matrix size as the size of the time-space code matrix.

7. The cooperative communication method of claim 3, wherein (c) further includes allowing the transmission vehicle to broadcast information on a predetermined row signal that each of the adjacent repeaters transmits among the signals of the time-space matrix type together with all row signals of the time-space code matrix of determined size.

8. The cooperative communication method of claim 3, wherein (c) further includes allowing the vehicle-S to broadcast information on a predetermined row signal that each of the adjacent repeaters transmits among the signals of the time-space matrix type together with all row signals by determining the size of the time-space code matrix.

9. A cooperative communication method in a vehicle communication system, comprising:

(a) allowing a transmission vehicle to initialize parameters of the transmission vehicle and scan signals for adjacent repeaters positioned adjacent to the transmission vehicle, the parameters including a threshold distance and a maximum number of repeaters;

(b) allowing the transmission vehicle to select repeaters that the selected repeaters number is equal to or less than the maximum number of repeaters, select information on the selected repeaters, and verify distances to the selected repeaters when receiving a signal from an adjacent repeater;

(c) allowing the transmission vehicle to classify a signal as a decode-and-forward group when a distance to a selected repeater is smaller than the threshold distance and determine size of a time-space code matrix to broadcast a signal to the adjacent repeaters;

(d) allowing the adjacent repeaters to demodulate the broadcast signal received from the transmission vehicle generate a time-space code matrix of the size of the time-space code matrix, and transmit a signal corresponding to each repeater to a reception vehicle; and (e) allowing the reception vehicle to combine and demodulate a received signal when the received signal is stored in a buffer and thereafter signals are received from all repeaters.

10. The cooperative communication method of claim 9, wherein, in (c), the transmission vehicle compares the maximum matrix size of a predetermined time-space code with size of a matrix of the decode-and-forward group, and when the size of the matrix of the decode-and-forward group is smaller than the maximum matrix size, the transmission vehicle sets the size of the matrix of the decode-and-forward group as the size of the time-space code matrix, and when the size of the matrix of the decode-and-forward group is larger than the maximum matrix size, the transmission vehicle sets the maximum matrix size as the size of the time-space code matrix.

* * * * *